(No Model.)

T. W. HEERMANS.
DISK GOVERNOR.

No. 302,564.  Patented July 29, 1884.

Witnesses:
Albert H. Adams,
O. W. Bond

Inventor:
Thaddeus W. Heermans

UNITED STATES PATENT OFFICE.

THADDEUS W. HEERMANS, OF CHICAGO, ILLINOIS.

DISK-GOVERNOR.

SPECIFICATION forming part of Letters Patent No. 302,564, dated July 29, 1884.

Application filed March 1, 1884. (No model.)

*To all whom it may concern:*

Be it known that I, THADDEUS W. HEERMANS, residing at Chicago, in the county of Cook and State of Illinois, and a citizen of the United States, have invented certain new and useful Improvements in Disk-Governors, of which the following is a full description, reference being had to the accompanying drawings, in which—

Figure 1:
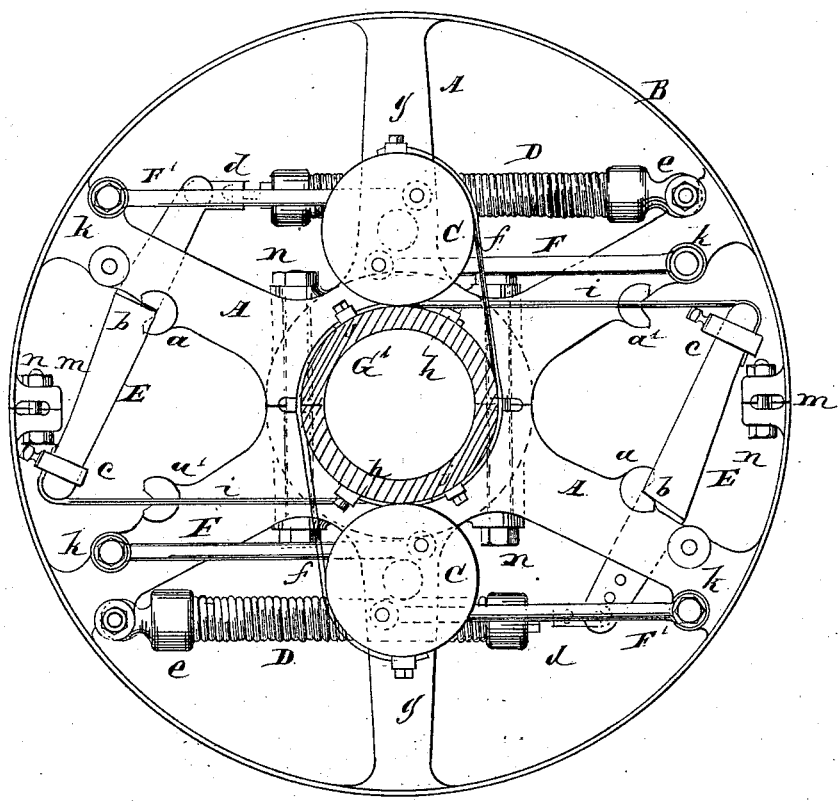
Figure 2:
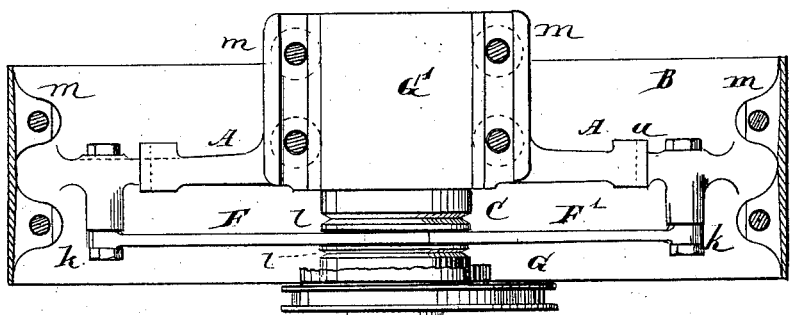

Figure 1 is a plan view with the eccentric removed; Fig. 2, a cross-section with the eccentric partly broken away.

This invention relates to the class of governors for steam-engines known as "disk-governors." Its object is to improve their construction and operation, so as to render them more sensitive, rapid, and accurate in their action; and its nature consists in the several combinations of parts hereinafter claimed as new.

In the drawings, A indicates the arms of the disk; B, the rim; C, the weights; D, the springs; E, the levers; F F', connecting-rods for the weights; G', hub, and G collar of the eccentric; H, eccentric; $a$ $a'$, bearings or fulcrum for the levers E; $b$, knife-edges for the bearings for the levers E on their pivots or fulcrum; $c$, adjusting-collars for attaching a wire rope or strap to the lever ends; $d$, attachment for connecting the opposite ends of the lever-arms with the springs D; $e$, couplings for attaching the springs to the arms A; $f$, wire ropes or straps for connecting the weights C with the eccentric or with its collar; $g$, set-screws for attaching the ropes or straps to the weights; $h$, set-screws or collars for attaching the ropes $f$ to the eccentric; $i$ wire ropes or straps for connecting the longer arms of the lever-bars with the eccentric or with its collar; $j$, set-screws or collars for attaching the ropes $i$ to the eccentric or to its collar; $k$, pivotal attachments for connecting the rods F F' with the arms A; $l$, grooves in the ball or weight for the wire ropes; $m$ $n$, flanges and bolts for attaching the parts of the disk together when it is made in halves.

The disk A B is, by preference, made in half-sections and fastened together by the bolts $n$ and flanges $m$. Four of the arms A are provided with projections $a$ $a'$, which are notched or otherwise fitted to act as bearings for the levers E. When the engine is intended to run in one direction, the levers are stationed at the projections or bosses $a$, as shown; but when the engine is to be run in the reverse direction the levers are stationed at the bosses $a'$, and the balls or weights turned over, so as to roll the eccentric in the opposite direction, the same parts being used in either case. The disk is provided with proper bosses and holes for this purpose. The disk is fastened to the shaft, while the eccentric with its collar or sleeve is free to turn. The arms A are also provided with bearings $k$, for attaching thereto the supporting-rods F F' of the weights C.

The arms F' are attached to the disk $k$ and to the weights, as shown in dotted lines, Fig. 1. In order to bring the attaching-points of these arms or rods near the center of the weights, as shown, a groove is formed in the weight for this purpose, as partly appears in Fig. 2.

To the periphery of each of the weights C, I attach by the set-screw or clamp $g$ a wire rope, $f$, which passes partly around the weight, and then to and partly around the sleeve or concentric part of the eccentric, to which they are attached by the set-screws or clamps $h$.

The longer ends of the levers E are grooved or otherwise fitted to receive the wire ropes $i$, which are attached thereto by the collars or set-screws $c$, and pass from the lever ends to the collar G, and partly around it, and are attached thereto by the set-screws or clamps $j$. In the ordinary construction and use the ropes $f$ and $i$ are usually made of wire; but chains or thin metallic bands or flat straps might be used in their place. When flat straps are used, neither the collar nor weights require grooving. The levers E are shouldered or bent at $b$, so as to pass to the opposite side of the arm A, upon which they are supported, and on the shouldered part a knife-edge or other suitable pivoted bearing is formed to rest against the shoulder or notch $a$. The short ends of these levers are provided with a series of holes, so as to give the parts more or less action, as may be desired, and in one of these holes the coupling $d$ is placed, by means of which the lever is connected with the cap of the springs D. The springs D are stiff coiled or helical springs, and at their opposite ends they are attached to the arms A by the collars and coupling $e$. The action of these springs is, primarily, contractile, and when the disk is at rest or under a slow motion they hold the parts in the position shown in Fig. 1, and so that the pivotal connections of the rods F F′, with the weights C, pass each other, as shown in said figure.

In operation, as the speed of the disk increases, the tendency of the weights C is outward or toward the rim B, and their connection with the rods F F′ is such that they cannot move or be moved outward without a partial rotation, which rotation may continue until the pivots of the arms F F′ in the weights come in line, which outward movement, with its limit, gives the weights a quarter-turn, and by pivoting the rods near the center of the weights and attaching the ropes $f$ to the periphery an increased motion is given to these ropes, which is sufficient within the limits to turn the eccentric one-quarter around, as the turning of the weights C rotates the eccentric by reason of the ropes $f$ being attached thereto. If these weights were free to move, they would reach their outward limit with too much ease. This is prevented and their movements regulated by the springs D, levers E, and ropes $i$, which operate in a contrary direction to the weights and ropes $f$, and constantly tend to bring the weights back to their inner position. The springs D will be made as nearly accurate as possible; but their tension may be regulated or adjusted by the series of holes in the levers E. The eccentric-rod is attached to the eccentric H in the ordinary manner, and is connected with the cut-off valve of the engine in the usual manner, instead of being connected with a throttle-valve. By this construction and arrangement of the parts I produce a disk-governor which is easily regulated and adjusted, which is sensitive in its action, and which communicates its action to the eccentric more readily and quickly than has heretofore been the case for this class of valves; and by attaching the ropes to the peripheries of the weights and their supporting-arms near their centers an increased action on the eccentric is given, by reason of the increased action given to the ropes $f$ by their attachment to the periphery of the weights, and thereby moving in the arc of a larger circle, so that a slight movement of the weights gives a considerable movement to the eccentric, and in this way making it more sensitive and more quickly responsive.

What I claim as new, and desire to secure by Letters Patent, is—

1. The combination of the weights C, supported upon the arms F F′, pivoted to the weights below their peripheries, in combination with the ropes $f$, attached to their peripheries, and the eccentric G H, substantially as specified.

2. The combination of the levers E, supported substantially as described, with the springs D, ropes $i$, and eccentric G H, substantially as set forth.

3. The combination of the weights C, rods F F′, ropes $f$, levers E, springs D, and ropes $i$, with the eccentric G H, substantially as specified.

4. In a disk-governor, the combination of the strap $f$, directly connected with the weight and the eccentric or its collar, whereby a direct connection is had and the movement of the eccentric increased, substantially as and for the purpose specified.

THADDEUS W. HEERMANS.

Witnesses:
L. L. BOND,
ALBERT H. ADAMS.